United States Patent [19]

Shaw

[11] 4,213,658

[45] Jul. 22, 1980

[54] TOOL GUIDE BUSHING MOUNTING ASSEMBLY

[75] Inventor: Nathan O. Shaw, Glendale, Calif.

[73] Assignee: All American Products Company, Inc., Glendale, Calif.

[21] Appl. No.: 47,547

[22] Filed: Jun. 11, 1979

[51] Int. Cl.³ .............................................. F16C 35/02
[52] U.S. Cl. ..................................................... 308/15
[58] Field of Search ................. 308/15, 237 R, 22, 37, 308/239, 245; 174/165; 408/241

[56] References Cited

U.S. PATENT DOCUMENTS

| 3,001,421 | 9/1961 | Martens | 408/241 |
| 3,015,242 | 1/1962 | Armacost | 174/165 |

*Primary Examiner*—Lenard A. Footland
*Attorney, Agent, or Firm*—Jessup & Beecher

[57] ABSTRACT

A tool guide bushing mounting assembly comprised of a bushing liner which has a threaded sleeve for a locking screw secured to it with an adhesive. The locking screw sleeve is secured to the liner with a metal carbide epoxy securely positioning the sleeve relative to the bushing liner. The bushing mounting assembly may then be cast into a tool guide sometimes called a jig with the liner flush with the top and bottom surfaces of the jig, assuring proper positioning of the locking screw with respect to the bushing. The universal bushing mounting assembly may be used with either slip renewable, slip/fixed renewable or fixed renewable bushings.

1 Claim, 7 Drawing Figures

U.S. Patent  Jul. 22, 1980  4,213,658
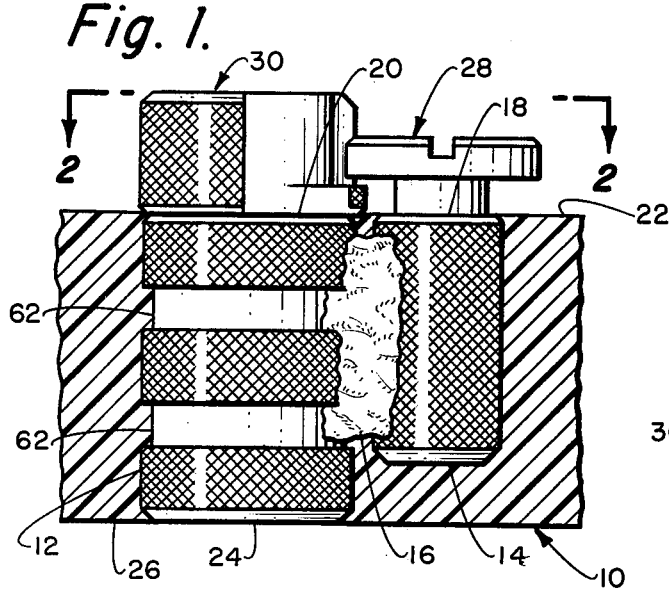
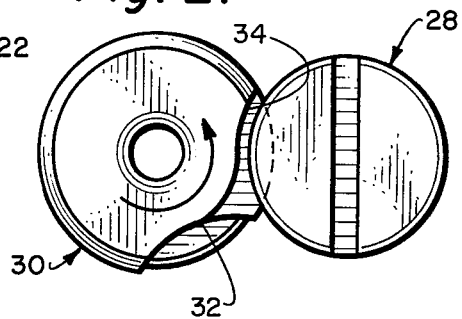
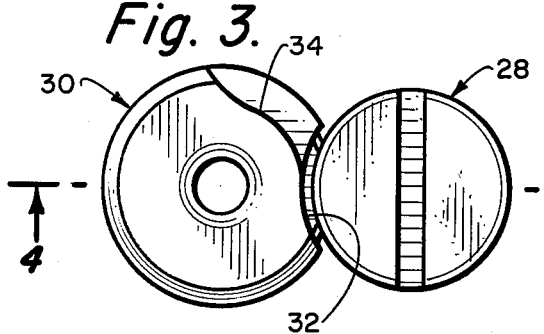
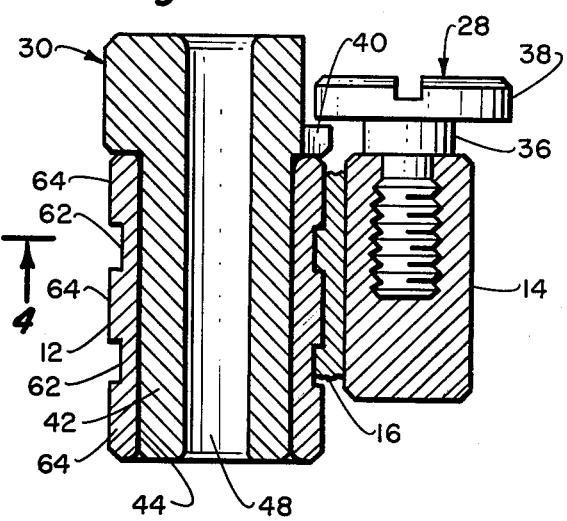
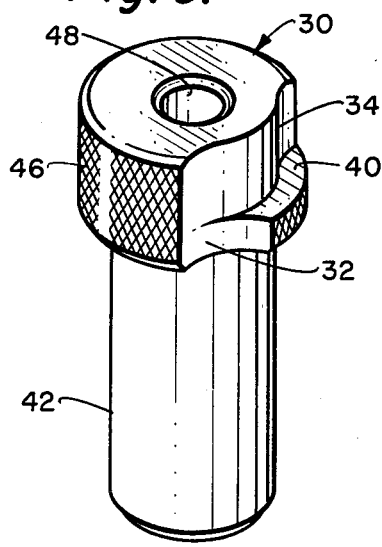
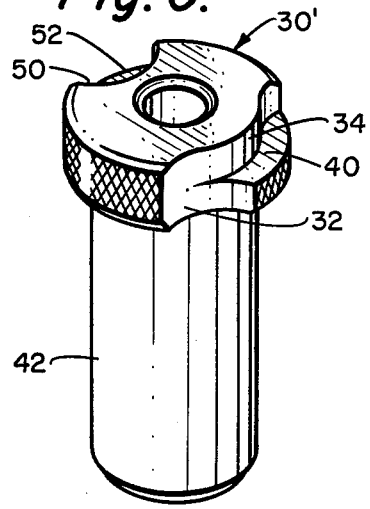
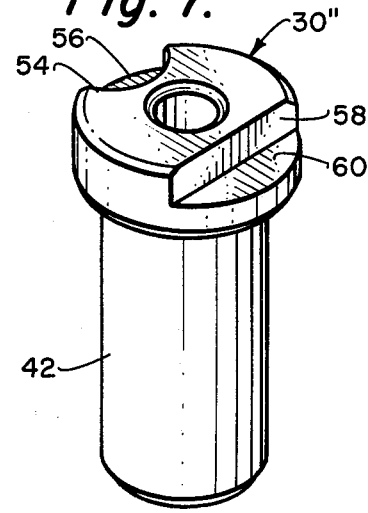

TOOL GUIDE BUSHING MOUNTING ASSEMBLY

BACKGROUND OF THE INVENTION

This invention relates to bushing mountings for tool guide jigs, and more particularly relates to a bushing mounting assembly for use with a variety of tool bushings.

Tool guide jigs are usually in the form of plates with holes machined or cast in place for acceptance of liners for use with tool guide bushings. Tool guide jigs are used for production line manufacture of many parts assuring accurate placement of holes in a proper pattern. Further, each of the bushing liners permits quick and easy removal and replacement of a tool guide bushing when it becomes worn or damaged. These bushings are designated in the art as "renewable bushings." Also, if several different operations are performed with different size tools, it may be necessary to change the bushings to accommodate different size tools.

In the manufacture of these jigs, such as metal jigs, the holes for placement of the bushing liner can be provided in the manufacturing of the jigs and bushings, then press fitted into the holes. However, where the jig is to be used on uneven or contoured surfaces, the liners must be cast in place. For this purpose, the bushing liner must be positioned with extreme accuracy and then the jig cast around it. For liners used with a threaded sleeve and locking screw, the relative position of the liner and the locking screw sleeve is extremely difficult to maintain. Thus, when the jig is being cast, movement of the liner or sleeve with respect to each other may result in a jig which is unusable.

SUMMARY OF THE INVENTION

The purpose of the present invention is to provide a universal bushing mounting assembly for casting in place in tool guide jigs.

The bushing mounting assembly of the present invention is comprised of a bushing liner having a locking screw sleeve securely attached to the liner by an adhesive. This assembly has a universal application as it can be used with a variety of renewable type bushings after it is cast into a jig. The sleeve is positioned with one end on the same plane as one end of the liner and they are securely fastened together by an epoxy adhesive. By securing the two parts together with the epoxy adhesive, their relative positions are maintained throughout the process of casting a tool guide jig. Further, the adhesive used is preferably an epoxy having a metal carbide composition which provides a very strong bond between the liner and the sleeve. The bond must be strong enough to maintain the relative position of the two parts during the casting process. Thus an epoxy adhesive is sufficient because when the jig is finally cast, the casting material, such as an epoxy, cast all around the universal bushing mounting assembly maintains their position during use as a tool guide. Thus the epoxy adhesive is adequate for the purposes of the invention because it is strong enough to assure that the liner and sleeve will not separate during shipping and handling during the casting process. Once the bushing mounting assembly is cast into the jig the adhesive securing the parts together is less important because once the jig is cast, the entire outside diameter of both pieces grip and hold the bushing mounting assembly into the cast jig plate itself. Thus, when the jig is in use, there is only a small force, if any, against the adhesive securing the liner and sleeve together. Thus, the bushing mounting assembly is easy to manufacture and cast in place in a tool guide jig. The expense of lock screw location or manufacturing special parts is therefore eliminated.

The advantages and novel features of the invention will become apparent from the following detailed description of the invention when considered in conjunction with the accompanying drawings.

BRIEF DESCRIPTION OF THE DRAWINGS

FIG. 1 illustrates the universal bushing mounting assembly of the invention cast into a jig.

FIG. 2 is a top view of the bushing mounting assembly.

FIG. 3 is a top view of the bushing mounting assembly with the tool guide bushing rotated for removal.

FIG. 4 is a sectional view of the bushing mounting assembly taken at 4—4 of FIG. 3.

FIG. 5 illustrates a slip renewable bushing.

FIG. 6 illustrates a slip/fixed renewable bushing.

FIG. 7 illustrates a fixed renewable bushing with clamping flats.

DETAILED DESCRIPTION OF THE PREFERRED EMBODIMENT

Referring to FIG. 1, there is shown a jig 10 having a liner 12 and a locking screw sleeve 14 cast in place. The locking screw sleeve 14 is secured to the liner by an adhesive 16 to properly position the sleeve with respect to the liner 12 during the casting process with the upper surfaces 18 and 20 being in the same plane, flush with the upper surface 22 of the jig 10. The bottom surface 24 of the liner 12 is flush with the bottom surface 26 of the tool guide jig 10. The sleeve 14 accepts a locking screw 28 for securing a bushing 30 in the mounting assembly.

The bushing 30 shown is a slip renewable bushing having a mill slot 32 to provide clearance for removal from the liner 12. The head of the bushing 30 also has an arcuate slot 34 allowing the bushing to rotate for retention by the locking screw 28. When the bushing 30 is in the position illustrated in FIG. 2, it cannot be removed from the liner 12. However, by simply rotating the bushing in the direction illustrated by the arrow until the mill slot 32 is positioned as illustrated in FIG. 3, the bushing can be lifted out and replaced or renewed, if damaged or worn, or another bushing is needed for a second operation. The locking screw 28 has the shoulder 36 illustrated in FIG. 4 to stop the head 38 short of the lip 40 on the bushing 30 to allow the bushing to rotate or "slip".

The bushing mounting assembly is particularly advantageous because it has a universal application and can be used with either slip renewable, fixed renewable, or the combination slip/fixed renewable type bushing. These three types of bushings, which can be used with this bushing mounting assembly, are illustrated in FIGS. 5, 6 and 7. The slip renewable bushing illustrated in the mounting assembly in FIGS. 1 through 4 is shown in FIG. 5 and has a body 42 fitting the bore 44 of the bushing liner 12. The bushing has a head with a mill slot 32 and an arcuate surface 34, providing a lip 40 for retaining the bushing in the liner 12. The bushings 30 are provided with a through hole 48 for guiding a tool. The through hole 48 is sized according to the particular tool or drill being used. The bushing 30' shown in FIG. 6 also has the body 42, the mill slot 32, lip 40 and arcuate surface 34. However, this particular bushing is a combination device and provides a second mill slot 50 providing a clamping flat or surface 52 for using the bushing as a fixed renewable bushing. For slip renewable use, this bushing is installed in the liner 12 in the same manner as the slip renewable bushing 30 shown with the clamping screw 28 fitting the mill slot 50. For fixed renewable use the screw 28 is removed, the bushing installed, then the screw replaced with the head fitting mill slot 32. The bushing is thus fixed and prevented from rotating in the liner 12. Alternately, a round clamp (not shown) can be used in place of clamping screw 38 for securely clamping the bushing 30' in the sleeve 12.

The bushing 30" also has the the same body 42 as the previous bushings fitting the bore 44 of the sleeve 12, but has a curved mill slot design 54 on one side of the head and a flat mill slot 58 on the opposite side of the head, clamping flats 56 and 69 respectively. The fixed renewable bushing 30" is used by first removing the locking screw 38. Alternately, either a rounded end clamp fitting the round slot 54 or a flat end clamp fitting the flat slot 58 may be used to securely clamp the bushing 30" against movement.

The slip renewable bushing 30 used in conjunction with the bushing mounting assembly and liner 12 is for use in production runs of any length where more than one operation is to be performed in the same hole, such as drilling and then reaming or counterboring. The slip renewable design allows rapid installation and removal of the bushing. A 45° turn after insertion, as shown in FIG. 3, locks it securely in place or allows easy removal due to the mill slot 32 in the head for receipt of the lock screw head 38. The fixed renewable bushing illustrated in FIG. 7 is ideal for long production runs where the number of parts to be drilled or reamed is greater than the normal wear life of the bushing. The bushing is inserted in the liner 12 and is secured in place by the lock screw 28 or a round or flat clamp (not shown) used in conjunction with the screw. This bushing may be easily replaced by simply removing the lock screw and/or clamp without removing the jig or fixture from the production line. The two-in-one drill bushing or slip/fixed renewable type shown in FIG. 6 offers greater versatility, economy and convenience. This bushing may be used for production runs of any length where more than one operation is performed in the same hole, such as drilling and then reaming or counterboring. Because the bushing can also be used in a fixed clamped fashion, it is also ideal for long production runs when a number of parts to be drilled or reamed may be greater than the normal wear life of the drill bushing. It may be secured by the locking screw 28 or a locking clamp (not shown). This bushing allows both the features and advantages of the slip renewable or the fixed renewable bushings alone. In each case the bushing has a body 42 and a somewhat larger head providing an annular surface or shoulder which seats on the top surface 20 of the bushing liner 12.

The bushing liner 12 is cylindrical as described hereinabove and has one or more spaced grooves 62 and 64 which act to secure the liner in the jig 10 to prevent any axial movement. In addition, the ridges 64 between the grooves 62 are provided with a knurled or roughened surface providing resistance against rotational movement of the liner 12 and sleeve 14. The bushings may also be provided with a roughened or knurled surface for ease in handling, as shown. The knurled surface shown is called a "diamond groove." Other types of roughened surfaces may be provided, such as a serrated groove which are vertical cuts in the exterior surface of the liner 12, or a full knurl, which is a roughened surface over the entire liner 12 without the grooves 62.

The bushing mounting assembly shown is truly universal and unique in that it provides accurate cast-in-place mounting of a bushing liner and locking screw sleeve and the use of a variety of bushings. The bushing liner can be used with either the slip or fixed or the two-in-one slip/fixed renewable bushings providing great versatility and adaptability.

Obviously, many modifications and variations of the present invention are possible in light of the above teachings. It is therefore to be understood that the full scope of the invention is not limited to the details disclosed herein and may be practiced otherwise than as specifically described.

What is claimed is:

1. A bushing mounting assembly for molding in place in a jig comprising:
   a cylindrical liner having a bore therethrough;
   a threaded cylindrical sleeve positioned adjacent to said liner with the end of said sleeve in planar alignment with the end of said cylindrical liner;
   adhesive means securing said sleeve permanently to said liner;
   a locking screw in said threaded sleeve whereby said bushing assembly may be molded in place in a jig with the ends of the liner being flush with the top and bottom surfaces of said jig, said bushing liner assembly adapted to receive slip or fixed renewable bushings or combinations thereof.

* * * * *